United States Patent [19]
Cornelissen et al.

[11] Patent Number: 5,462,164
[45] Date of Patent: Oct. 31, 1995

[54] HIGHTIGHT FILM PACKAGE

[76] Inventors: Herman Cornelissen; Paul Wouters, both of c/o Agfa-Gevaert N.V., Septestraat 27, B 2640 Mortsel, Belgium

[21] Appl. No.: 301,579

[22] Filed: Sep. 7, 1994

[30] Foreign Application Priority Data

Sep. 17, 1993 [NL] Netherlands .................. 93202699

[51] Int. Cl.$^6$ .................. B65D 85/67; B65D 85/672
[52] U.S. Cl. .................. 206/389; 206/413; 206/414; 206/416; 206/455; 354/275; 354/277
[58] Field of Search .................. 206/389, 413, 206/414, 415, 416, 454, 455, 410; 242/580, 580.1; 354/275, 277

[56] References Cited

U.S. PATENT DOCUMENTS

| | | | |
|---|---|---|---|
| 4,325,620 | 4/1982 | Holley | 354/127 |
| 4,883,235 | 11/1989 | Niedospial, Jr. | 242/71.1 |
| 4,962,401 | 10/1990 | Takahashi | 354/275 |
| 4,978,985 | 12/1990 | Smart et al. | 354/275 |
| 5,032,854 | 7/1991 | Smart et al. | 354/21 |
| 5,188,306 | 2/1993 | Kataoka et al. | 242/71.1 |
| 5,271,983 | 12/1993 | Ise et al. | 428/92 |
| 5,346,067 | 9/1994 | Haufe et al. | 206/497 |

*Primary Examiner*—Jimmy G. Foster
*Assistant Examiner*—Tara L. Laster
*Attorney, Agent, or Firm*—William J. Daniel

[57] ABSTRACT

A lighttight package for rolled light-sensitive material includes a core, light-impervious flanges at opposite ends of the core, a roll of the light-sensitive material wound on the core between the flanges, and a light-shielding circumferential wrapper enclosing the roll. The flanges each have a circumferential groove extending radially inwardly from the periphery thereof into which the axial margins of the wrapper are folded radially inwardly and inserted and retained, preferably by a clamping action. The groove is defined between opposed wall sections of the flange and at least one of the wall section can be relatively flexible to facilitate insertion of the wrapper margin therein. The inner termination of the wrapper margin within the groove can be re-entrantly bent and a cord or string can be laid within the re-entrant bend to provide greater security against premature withdrawal of the wrapper margins from the groove. The wrapper can be attached at a trailing edge to the leading end of the material roll so that a free opposite edge of the wrapper can serve as a leader for starting the unwinding of the roll.

14 Claims, 3 Drawing Sheets

HIGHTIGHT FILM PACKAGE

BACKGROUND OF THE INVENTION

1. Field of the Invention

The present invention relates to a lighttight package of a rolled light-sensitive material.

2. Description of the Prior Art

In the packaging of light-sensitive material for use in e.g. phototypesetters or X-ray imagers, disposable film roll cassettes as well as daylight loading film roll packages are used. Daylight loading film packages are cheaper than disposable film cassettes, and are also preferred for ecological reasons.

Several types of daylight loading film roll packages are known that comprise a circumferential wrapper and two end covers lighttightly sealed to the circumferential cover. In one embodiment, the circumferential wrapper has lips that are folded over the end covers and are sealed thereto (see U.S. Pat. No. 4,505,387 of Fuji Photo Film Co., Ltd.) In another embodiment the end covers have lips that are folded over the circumferential cover and are sealed thereto (see U.S. Pat. No. 4,148,395 of E.Kodak Cy.) In still another embodiment marginal portions of the circumferential and the end covers are sealed to each other at their inside faces (see U.S. Pat. No. 4,733,777 of Agfa-Gevaert N. V.) These, and similar packages have the advantage that their length is neglectably larger than the width of an unwrapped film roll so that their use in so-called machine-dedicated cassettes that are originally designed for being loaded in a darkroom with a roll of unwrapped film, does not raise problems. However, sealing the circumferential wrapper to the end covers at the respective marginal zones requires a great precision in the location of the respective elements in order to obtain a light-proof seal.

Other types of daylight loading film packages are known that comprise two flanges at opposite ends of a core and a circumferential wrapper sealed to the peripheral edge of the flanges. The flanges must have a substantial thickness to obtain a sufficiently strong seal. An example of suchlike package is disclosed in EP-A-03 26 260 of Sony Corp. A similar daylight loading film package with two end discs is disclosed in DE 41 33 530 C1 of Du Pont de Nemours GmbH, DE. This latter invention involves the use of end discs with an annular recess at their outside faces and of a flexible circumferential wrapper that is tensioned during its winding around the wound film roll so that its lateral, free margins will shrink and fold, and become seated in wrinkled form in the annular recesses of the flanges. The light-tightness of this package leaves much to be desire since the wrinkled margins inevitably have overlapping portions, the overlying areas of which cannot be in contact with the end disc and results in direct access by rays of incident light to the any gaps between the faces of the end discs and the wrapper tensioned thereover. If, for one reason or another, this tension is locally unsufficient to ensure good contact, light may reach the photographic material and cause fogging.

SUMMARY OF THE INVENTION

Object of the Invention

It is an object of the present invention to provide a package of a rolled light-sensitive material which comprises a core, a light-sensitive web wound on the core, a light-shielding circumferential cover to shield the circumferential surface of the wound web from ambient light, and a pair of light-shielding flanges to shield the side surfaces of the wound web, which offers an improved light-tightness over the packages known in the art, and which is less critical to manufacture, to transport and to manipulate.

Statement of Invention

In accordance with the present invention, a lighttight package of a rolled light-sensitive material, which comprises a core, a light-sensitive-web wound on the core, a light-shielding circumferential cover to shield the circumferential surface of the light-sensitive web from ambient light and a pair of light-shielding flanges to shield the side surfaces of the wound web, is characterised in that the flanges have a circumferential inwardly extending groove into which a folded margin of the circumferential cover is seated and secured.

The advantage of the inventive package resides in the fact that sealing from ambient light is achieved by a true labyrinth, viz. a re-entrant or U-shaped light path including a first leg between the outside wall of the groove and the folded margin of the cover, which extends to the bottom of the groove, and a second leg between the inside wall of the groove and the folded margin of the cover, which second leg is reversed in direction from that of the first leg over 180 degrees and which extends from the bottom of the groove to the circumferential edge of the inside wall of the groove.

The term "web" stands in the present specification for photographic film as well as paper.

The term "groove" stands for openings having in fact a radial dimension only, which are comparable with a slit because both opposite wall surfaces defining the groove contact each other in the absence of a folded margin of the circumferential wrapper, as well as for openings having not only a radial but an axial dimension as well so that the opposite wall surfaces are well separated from each other.

It is preferred that both the inner and outer surfaces of the circumferential cover are light-absorbing so that light-absorption will be maximal in the circumferential groove. The circumferential cover is suitably made of black pigmented low-density polyethylene, but-other suitable polymers either in monolayer form or as laminates can be used as well.

For the same reason of light interception, the flanges are preferably black coloured. The flanges can be made of plastics by injection-moulding, and suitable materials for them are high-density polyethylene, polypropylene and polystyrene.

A lighttight package according to the present invention can be used in two ways. Either as a darkroom loading package for loading a machine-dedicated cassette, or as a daylight loading package for loading a roll of film directly in the apparatus or for loading the film by daylight in a machine-dedicated cassette that then is put in the apparatus.

In the case of daylight loading, the circumferential cover is preferably attached to the leading edge of the rolled web so that it serves as a leader for pulling the film through the lighttight slot of the cassette into which it has been loaded. In an alternative embodiment the leading end of the film itself, or of a separate film strip attached to the leading edge of the wound film can be used as a leader protruding through the slot of the cassette for starting the unwinding of the circumferential cover and next the unwinding of the film.

For darkroom loading, the circumferential wrapper needs not be attached to the wound film since the operator will remove it by hand before loading the film roll in a cassette.

The following are preferred features of a package according to the present invention.

The folded margins of the package may have a U-shape including inwardly directed and outwardly directed annular portions. This has the advantage that, based on the inherent elasticity of the wrapping material, each legs of the U will be urged against the corresponding wall of the circumferential groove whereby an improved lighttightness is obtained.

A cord or string can be provided in the bottom of the groove formed by the inwardly and outwardly folded portions of the margins of the circumferential wrapper. Such cord allows the circumferential wrapper to be tightly fitted to the package and constitute thereby an extra measure preventing undesired unwinding of the wrapper, in addition to the usual sealing or security label which attaches the leading edge of the wrapper to the last winding, and signals inadvertant opening of the package. The described chord is preferably arranged for easy removal prior to the first use of the roll package.

The section of each of the flanges forming the outer wall of the circumferential groove are sufficiently deformable or flexible to allow their flexing away from the corresponding inside wall sections for widening the groove and facilitating thereby insertion of a folded margin of the circumferential cover into the groove.

This flexibility can be obtained by making the flanges two from of different flexibility, viz. a disc shaped part which is relatively rigid, and at the outside of the plain part a ring-like or annular part which is relatively flexible, both parts being suitably fastened together. Alternatively, the flanges can have a unitary construction, the greater flexibility of the outside wall of a circumferential groove being obtained by suitable weakening of the cross-section of such wall as compared with the inside wall of the groove.

The circumferential groove of the flanges is wider near the bottom than at its top. This has the advantage that the bright of a folded margin will less readily adhere to the bottom of the groove.

The circumferential groove of the flanges has a flared mouth. This has the advantage that insertion of the folded portion(s) of the margins of the circumferential wrapper is facilitated.

The section of each flange forming the outer wall of the circumferential grooves has a larger diameter than the inside wall sections. This has the advantage that the light-shielding wrapper and the wound photographic web are better protected against undesired mechanical contacts and that manipulation damage is minimized. A further advantage is that the outside wall sections of the grooves may be easily flexed away from the corresponding inside sections thereof to facilitate insertion of the margins of the wrapper into the grooves.

It will be understood that a lighttight package according to the present invention can lead to difficulties if it is used as a daylight loading package for daylight loading cassettes of phototypesetters, X-ray imagers, and the like that closely match the format of the wound film, more in particular its width. As a matter of fact, the end flanges of the inventive package add from one to some millimeters to the width of the package, and this can prevent loading of the package in a cassette that originally is designed for a determined netto film width. However, there are available types of cassettes that are less critical in this respect and that allow loading with slightly longer film rolls. The latter situation is particular true for so-called minilabs which are being used on an ever growing scale for the quick printing of amateur colour pictures, and the present invention is particularly intended for use in this kind of apparatus without, however, being limited thereto.

BRIEF DESCRIPTION OF THE DRAWINGS

The invention will be described hereinafter by way of example with reference to the drawings, wherein.

DETAILED DESCRIPTION OF THE INVENTION

Figure 1:
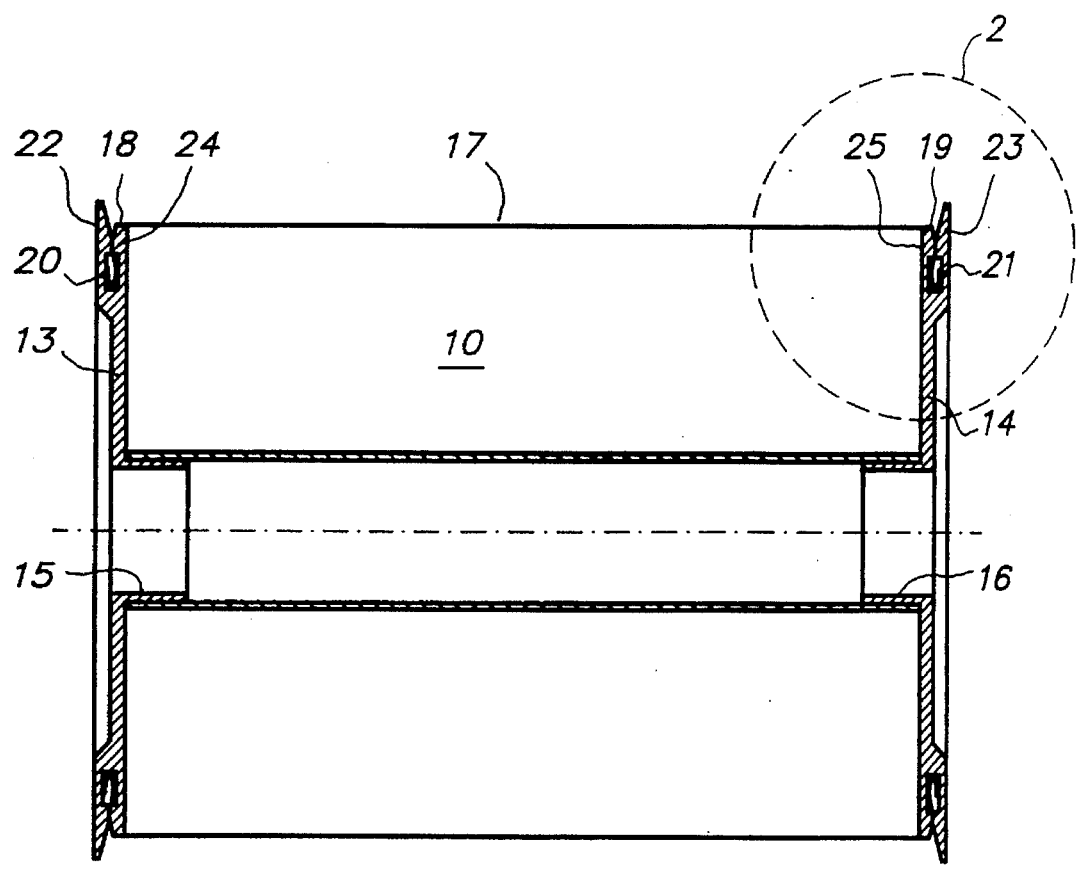
FIG. 1 is a longitudinal cross-sectional view of one embodiment of a package according to the present invention.

Referring to FIG. 1, one embodiment of a package according to the invention is shown which consists of a roll 10 of light-sensitive photographic film wound on a hollow core 12 having a length equal to the width of the film, and two circular end flanges 13 and 14 provided with hubs 15 and 16 that fit into the ends of the core. A light-shielding circumferential wrapper 17 is wound around the film roll and has lateral margins 18 and 19 folded and fitted in circumferential grooves 20 and 21 of the flanges.

The core of the film roll may be made of any material usual in the art such as cardboard, injection moulded or extruded plastic, etc.

The as a whole are rigid members capable of maintaining good contact with the lateral ends of the film roll during transport and handling of the package. Yet the outside wall sections 22, 23 of the flanges determining the circumferential grooves are suitably sufficiently flexible to allow their bending away from the corresponding inside wall sections 24, 25 as will be described hereinafter.

Figure 2:
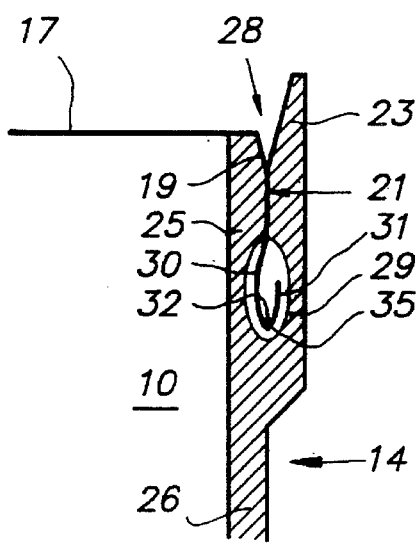
FIG. 2 is a detail in section view of a wrapper margin inserted into a groove of a flange, which comprises an inwardly and an outwardly folded portion, as well as a cord for fixing it in the groove.

One suitable embodiment of a flange is shown in FIG. 2, which is an enlarged detail or an area 2 indicated in broken lines in FIG. 1. Flange 14 comprises a plain or body section which has a central portion 26 and a wall section 25, and a co-axial ringlike secondary wall section 23. Wall sections 23 and 25 define a circumferential groove designated generally by numeral 21.

The groove has a flared mouth 28 and an enlarged bottom 29. The folded margin 19 of the circumferential wrapper 17 has an inwardly folded portion 30 and an outwardly folded one 31. A O-cord 32 is wound in the groove 35 formed by both-folded portions and holds folded margin 19 tightly in the groove. Both surface portions of groove 21 running parallel to each other can perform a clamping action on margin 19 extending therebetween as is shown in the drawing, but these surfaces may also be remote from each other and not perform a clamping action, the retaining of the margin as such occurring by cord 32. Cord 32 preferably has a free end accessible by hand from the outside of the flange to facilitate its removal prior to the unwinding of the film roll.

It should be understood that the presence of cord 32 is not indispensable. It has been shown that the fold between folded portions 30 and 31 of a margin of the wrapper has a substantial thickness or width, namely up to 10 times and more than the thickness of the wrapper itself, so that it, in effect, a circular bead which resists easy withdrawal of the wrapper margin from groove 21.

A further feature of flanges 13 and 14 is that the diameter of their outside wall sections 22 and 23 is slightly larger than that of sections 24 and 25. This feature has the advantage that shocks and the like occurring during inadvertent handling of the package are absorbed by these protruding wall sections, rather than directly by the film roll.

The flanges are suitably made of plastic, e.g. by injection-moulding. Increased flexibility of wall portions 22 and 23 with respect to the main portion of the flanges can be obtained in different ways.

According to one embodiment, wall portions 22 and 23 can be made as separate components, made of a relatively flexible plastic, and fitted to the opposed wall portions 24, 25 of the main portion of the flanges by suitable techniques known in the art such as ultrasonic or microwave welding, either over a circular zone or on spaced spots only, bonding by means of quick setting adhesives, rivetting, etc.

According to a different embodiment, wall sections 22, 23, 24 and 25 are made of the same material but increased flexibility of the outside sections is obtained by appropriate reduction of the wall thickness of these sections, such as by coaxial ring-like grooves.

Figure 3:
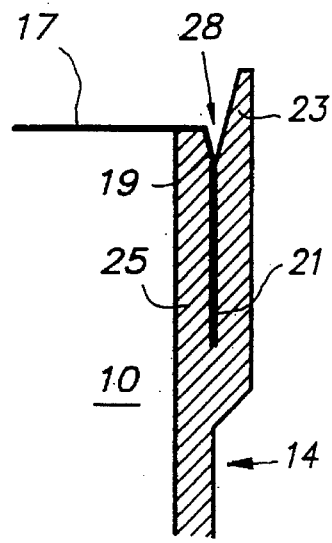
FIG. 3 is a detail in section view of a wrapper margin comprising a single fold in a circumferential groove of a flange.

FIG. 3 shows a different embodiment of a circumferential groove. The flange is arranged for receiving the folded margin 19 of the circumferential wrapper without a re-entrant fold and for that reason no widened bottom of groove 21 is provided. Since there is no bead like fold 35 in FIG. 2 for retaining the wrapper margin in the groove, it will be understood that it may be desirable for the opposed walls of sections 23 and 25 defining groove 21 to perform a clamping action on the folded wrapper margin.

In this respect it should be noted that the folded margin of the wrapper is not merely a single ply as illustrated in the figure but, on the contrary, comprises at a plurality of angularly spaced locations at least three plies constituted by overlapping portions of the wrapper margin as a consequence of its radially inward folding. The width of groove 21 may thus easily amount to at least three times the thickness of the wrapper foil.

Figure 4:
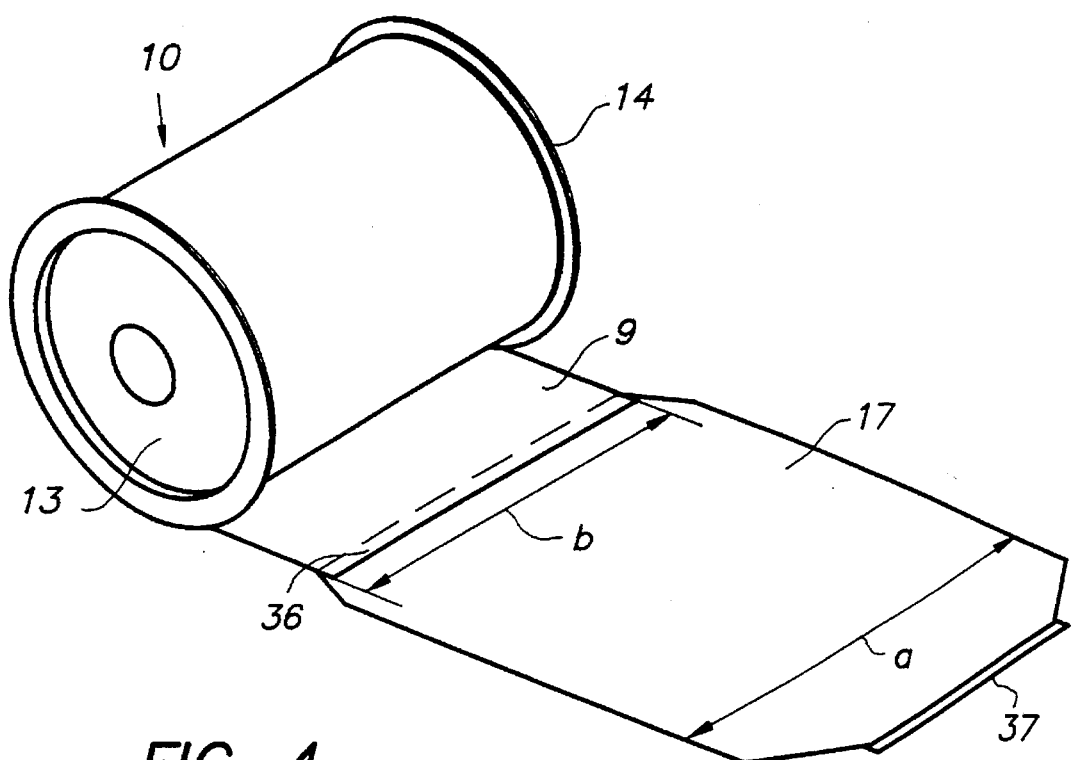
FIG. 4 is a perspective view showing the circumferential wrapper prior to its winding on the film roll.
Figure 5:
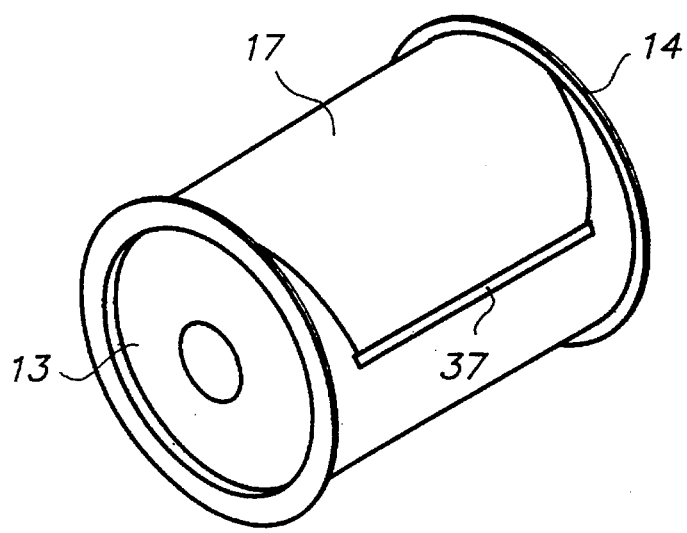
FIG. 5 is a perspective view of one embodiment of a finished package in accordance with the present invention.

FIG. 4 shows the film roll package just prior to the winding of the circumferential wrapper. Wrapper 17 may be removably attached to the leading edge 36 of film 9. The width a of the wrapper is slightly larger than the width b of the film, whereas the length of the wrapper equals at least 1.25 times the circumference of the wound film roll. A self-adhesive sealing strip 37 fixes the leading edge of the wrapper to the packed roll and can serve as a warranty label, see FIG. 5.

Figure 6:
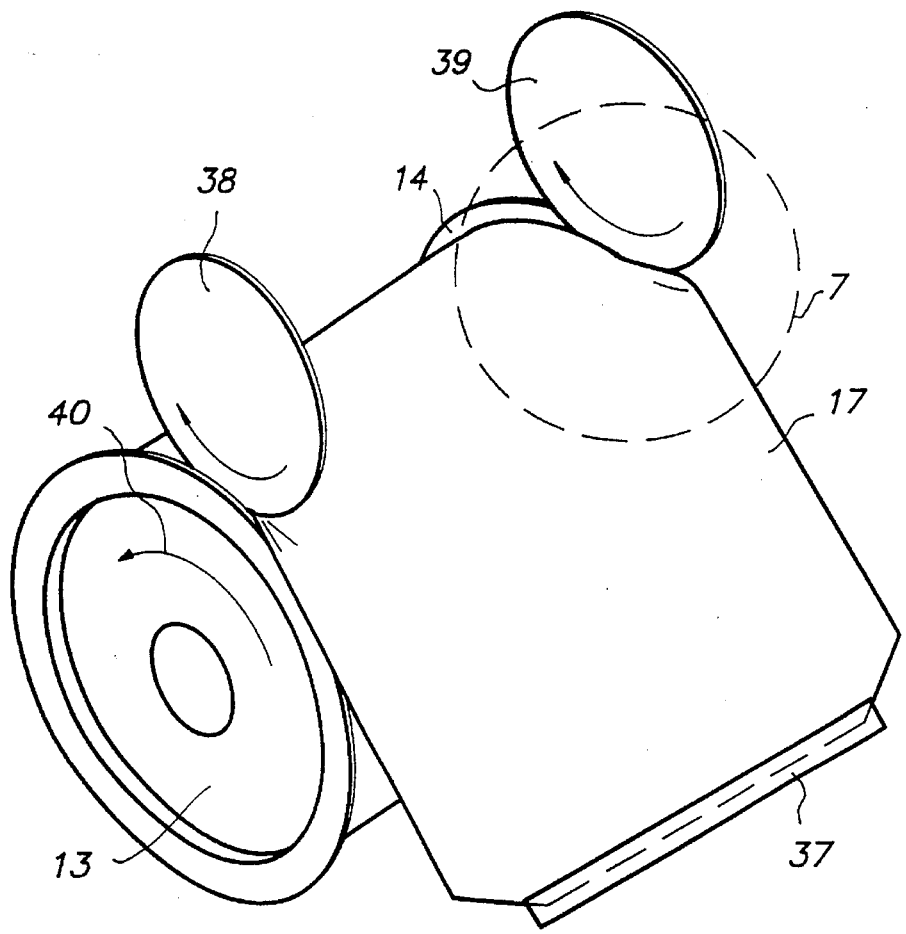
FIG. 6 is a perspective view illustrating the winding of the circumferential wrapper around a film roll and the insertion of its margins in the grooves of the flanges.
Figure 7:
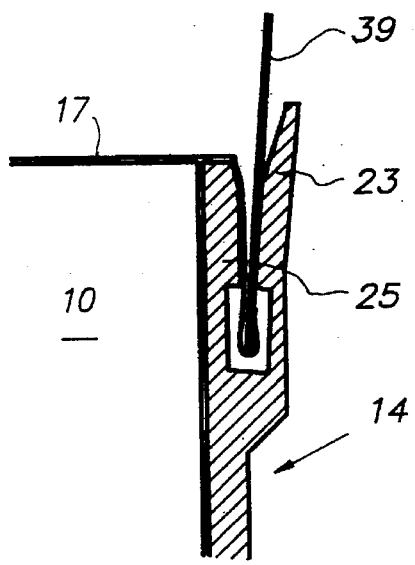
FIG. 7 is detail in section of FIG. 6.

FIG. 6 shows the winding of the circumferential wrapper. The film roll being mounted on a shaft, not shown, for rotation in the direction of arrow 40, two rotatable discs 38 and 39 are located in mutually slightly converging positions so that they urge the outside walls of the circumferential grooves in the flanges away from the inside walls, and simultaneously progressively fold and then insert the wrapper margins into the opened grooves, as shown in detail in FIG. 7 for flange 14.

We claim:

1. In a lighttight package of rolled light-sensitive material comprising a core, light-impervious flanges affixed to the opposite ends of said core, a roll of light-sensitive material wound on said core between said flanges, and a light-shielding circumferential wrapper enclosing said roll, the improvement wherein each of said flanges has a circumferential groove therein extending from an outer periphery of the flange radially inwardly and having a generally radially outwardly opening mouth, and said wrapper has side margins thereof folded radially inwardly into through said mouth and retained within said groove.

2. The package of claim 1 wherein said flanges are generally circular and have a diameter exceeding the diameter of said roll of light-sensitive material to thereby protect said roll.

3. The package of claim 2 wherein said flanges each comprises inner and outer wall sections for defining said groove therebetween and said outer wall sections have a diameter greater than the diameter of said inner wall sections.

4. The package of claim 1 wherein said flanges each comprises inner and outer wall section for defining said groove therebetween and at least one of said wall sections is sufficiently flexible to permit said wall sections to be urged apart for insertion of said wrapper margin into said groove.

5. The package of claim 1 wherein said mouth of said groove is flared in a radially outward direction to facilitate insertion of the wrapper margin into said groove.

6. The package of claim 1 wherein said groove has an inner end which is enlarged in an axial direction compared to the remainder of said groove and said wrapper margin adjacent its inner edge is doubled over in a radially outward direction and the doubled over inner edge is seated in said enlarged inner end of said groove.

7. The package of claim 1 wherein said circumferential grooves are defined between opposed wall sections of said flanges and said radially inwardly folded margins of said wrapper are clampingly engaged between said wall sections.

8. The package of claim 1 wherein an inner termination of each of said folded margins of said wrapper are re-entrantly bent within said groove.

9. The package of claim 8 wherein a cord is removably laid within the re-entrantly bent terminations of said margins to spread the same and enhance the retention of said terminations within said groove.

10. The package of claim 1 wherein each of said flanges comprises a body section and a coaxial annular secondary section affixed to said body section and defining with a corresponding annular area of said body section said circumferential groove.

11. The package of claim 10 wherein said annular secondary section is of greater flexibility in a direction transversely of said groove than at least said corresponding annular area of said body section.

12. The package of claim 1 wherein each of said flanges has a central hub fitting in telescoping relation into an end of said core.

13. The package of claim 12 wherein said hub make a rotatable fit with the end of said core.

14. The package of claim 1 wherein said circumferential wrapper has a trailing edge which is attached to a leading edge of said roll of material and a free leading edge which is adapted to serve as a leader for starting the unwinding of said roll.

* * * * *

UNITED STATES PATENT AND TRADEMARK OFFICE
CERTIFICATE OF CORRECTION

PATENT NO. : 5,462,164
DATED : October 31, 1995
INVENTOR(S) : HERMAN CORNELISSEN ET AL It is certified that error appears in the above-identified patent and that said Letters Patent is hereby corrected as shown below:

On the title page, and in column 1, line 1, in the title, change "HIGHTIGHT" to --LIGHTTIGHT--

Col. 6, line 14, after "into", insert --said circumferential groove--.

Signed and Sealed this

Sixth Day of August, 1996

Attest:

BRUCE LEHMAN

Attesting Officer

Commissioner of Patents and Trademarks